Oct. 20, 1959  G. E. NICHOLS ET AL  2,909,129
SLIPPER AND AXLE FOR HIGH SPEED TRACK VEHICLE
Filed June 11, 1956  3 Sheets-Sheet 1

INVENTORS:
George E. Nichols
Gordon A. Nelson
Thomas M. Casey
Robert E. Hogan

By Herbert E. Metcalf
Patent Attorney

Oct. 20, 1959 G. E. NICHOLS ET AL 2,909,129
SLIPPER AND AXLE FOR HIGH SPEED TRACK VEHICLE
Filed June 11, 1956 3 Sheets-Sheet 2
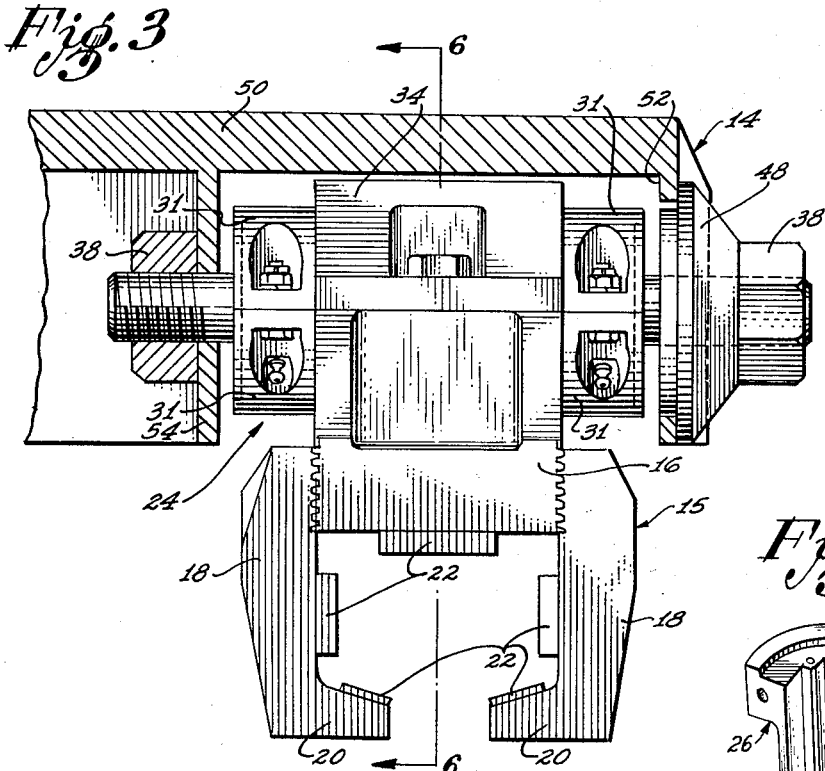
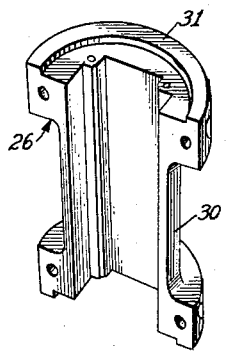
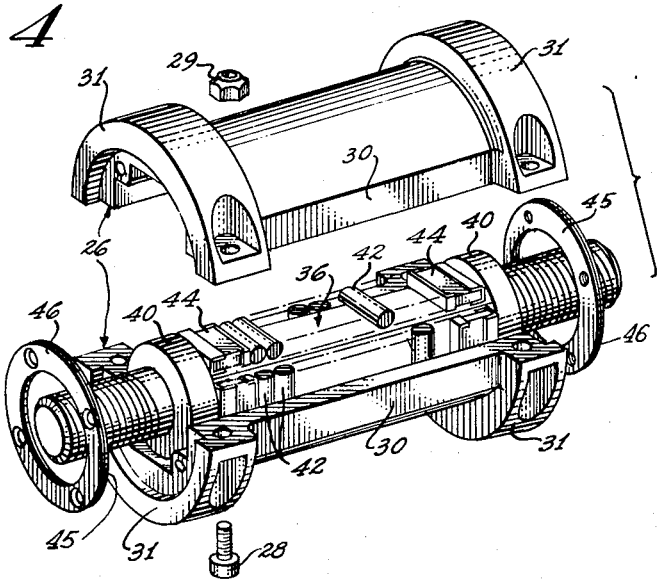
INVENTORS:
George E. Nichols
Gordon A. Nelson
Thomas M. Casey
Robert E. Hogan
By Herbert E. Metcalf
Their Patent Attorney Oct. 20, 1959  G. E. NICHOLS ET AL  2,909,129
SLIPPER AND AXLE FOR HIGH SPEED TRACK VEHICLE
Filed June 11, 1956  3 Sheets-Sheet 3

INVENTORS:
George E. Nichols
Gordon A. Nelson
Thomas A. Casey
Robert E. Hogan

By Willard M. Graham
Agent

United States Patent Office 2,909,129
Patented Oct. 20, 1959

2,909,129

SLIPPER AND AXLE FOR HIGH SPEED TRACK VEHICLE

George E. Nichols, La Canada, Gordon A. Nelson, Los Angeles, Thomas M. Casey, Gardena, and Robert E. Hogan, Los Angeles, Calif., assignors to Northrop Corporation, a corporation of California Application June 11, 1956, Serial No. 590,457

1 Claim. (Cl. 104—134)

This invention has to do with captive vehicles and more particularly with a slipper and axle for such vehicles.

The mere problem of coupling a substantial mass to the ground so that it will follow a predetermined course at relatively high speeds is a complicated one. The mass cannot be satisfactorily progressed on wheels of any type for many reasons, among them being the creation of enormous centrifugal forces in wheels of any size at high velocities, and the inability of such wheels to accelerate sufficiently fast to obtain the desired rolling velocity. While the mass must be easily accelerated and propelled at high velocities over a desired course, it must be so constructed and coupled to the ground that lateral and vertical accelerations can be limited to values that will not destroy the required coupling necessary to keep the mass on the desired course.

The land track upon which the land vehicle travels must necessarily be carefully dimensioned and aligned in order to minimize lateral and vertical accelerations during high velocity travel of the sled over the track.

The ideal free air test facility involving a sled travelling on slippers at transonic velocities along rails would require rails of zero tolerance in cross-sectional dimension, these rails being perfectly aligned with respect to each other. An ideal track should also have zero vertical and lateral displacements from a straight line. However, any physical track, regardless of the care with which it is laid and adjusted will follow some course other than the straight line. A sled moving along the rails and following both laterally and vertically the deviations of the rails will induce accelerations in its structure. The optimum condition sought is where the sled will travel along the rails in exactly a straight line despite the fact that the rails have local irregularities. One method of minimizing some if not a major portion of lateral accelerations of the sled per se is to have the forces caused by local irregularities take place in and be absorbed by the sled slippers.

It is, therefore, a broad object of the present invention to provide a means and method of so coupling a mass to the ground that the mass can be accelerated to travel safely over a predetermined course of substantial length at high velocities.

It has been found that a large mass can be coupled to the ground, and stay coupled thereto while being propelled at high speeds, by completely discarding the wheel of civilization, and reverting to the more ancient principle of the sled, and it is another broad object of the present invention to provide a means and method of slidably coupling a heavy mass to the ground and to hold the mass to a predetermined course at velocities including relatively high.

Another object of this invention is to provide a slipper and axle for a high speed track vehicle that will absorb most of the lateral accelerations that may occur due to track distortion and protect the vehicle from having these accelerations transmitted thereto.

Another object of this invention is to provide a slipper and axle for a high speed track vehicle that has a mass that is relatively light as compared with the mass of the vehicle and therefore can absorb some lateral accelerations, due to track distortion, without transmitting the said accelerations to the sled.

A yet further object of this invention is to provide a slipper and axle for a high speed track vehicle that is readily fabricated, easily maintained and operationally sound in principle and practice.

Briefly, the invention comprises a slipper body having an axle assembly retained therein. The axle per se is rigidly attached to the high speed track vehicle but the axle housing rigidly coupled to the slipper is capable of movement independent of the mass of the vehicle which effectively absorbs the lateral motions that may occur as a result of track distortion. The mass of the slipper and axle is relatively light as compared with that of the sled and therefore may readily move in lateral directions to absorb lateral forces that may occur due to track distortion.

Figure 3 is an end view of the slipper and axle taken from Figure 2 indicated by the arrow identified by the numeral 3.

Figure 4 is an exploded view illustrating the axle and all component parts.

Figure 5 is an interior, perspective view of one half of the axle housing.

Figure 1:
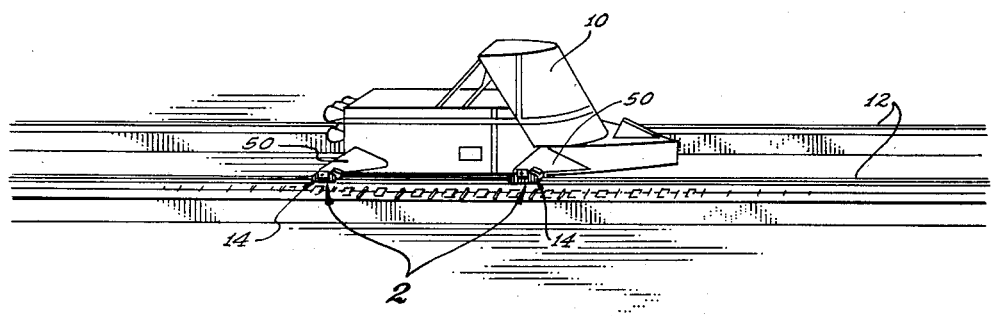
Figure 1 is a perspective view of a high speed track vehicle on which is secured the slipper and axle of the present invention.

Referring to the drawings for a more detailed description of the present invention 10 designates a sled mounted on substantially parallel tracks 12. The sled is made captive to the tracks by slippers and axles broadly designated 14. Each of the four slippers and axles used on the sled is identical to the others, therefore only one will be described.

The slipper broadly designated 15 comprises an elongated upper member 16 the edges of which are serrated to mesh with the serrated face of a pair of slipper sides 18. The slipper sides 18 project downwardly over the sides of the rail on tracks 12 to terminate in internal flanges 20 hooking underneath the railhead to resist lift. Each side 18 and the member 16 have removable inserts 22 therein. The serrations of the member 16 as meshed with the serrations on the faces of sides 18 lend shear resisting strength to the slippers.

The general configuration of the member 16 is that of a trapezoid with the apex having an elongated concavity therein that is perpendicular to the longitudinal axis of the slipper 15.

Figure 2:
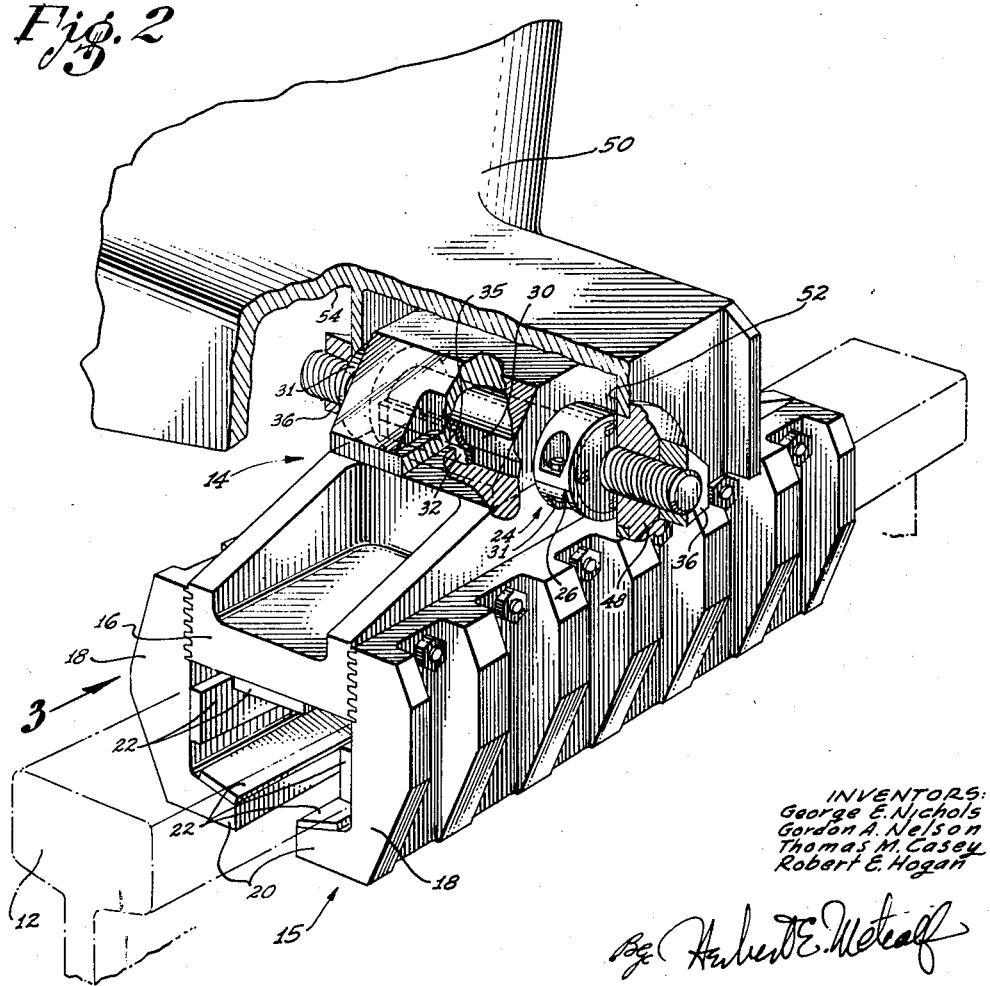
Figure 2 is an enlarged, perspective view illustrating and having embodied therein the present invention as taken from Figure 1 and identified by the arrows bearing numeral 2, parts being broken away for purposes of clarifying the construction and location of essential structure.
Figure 6:
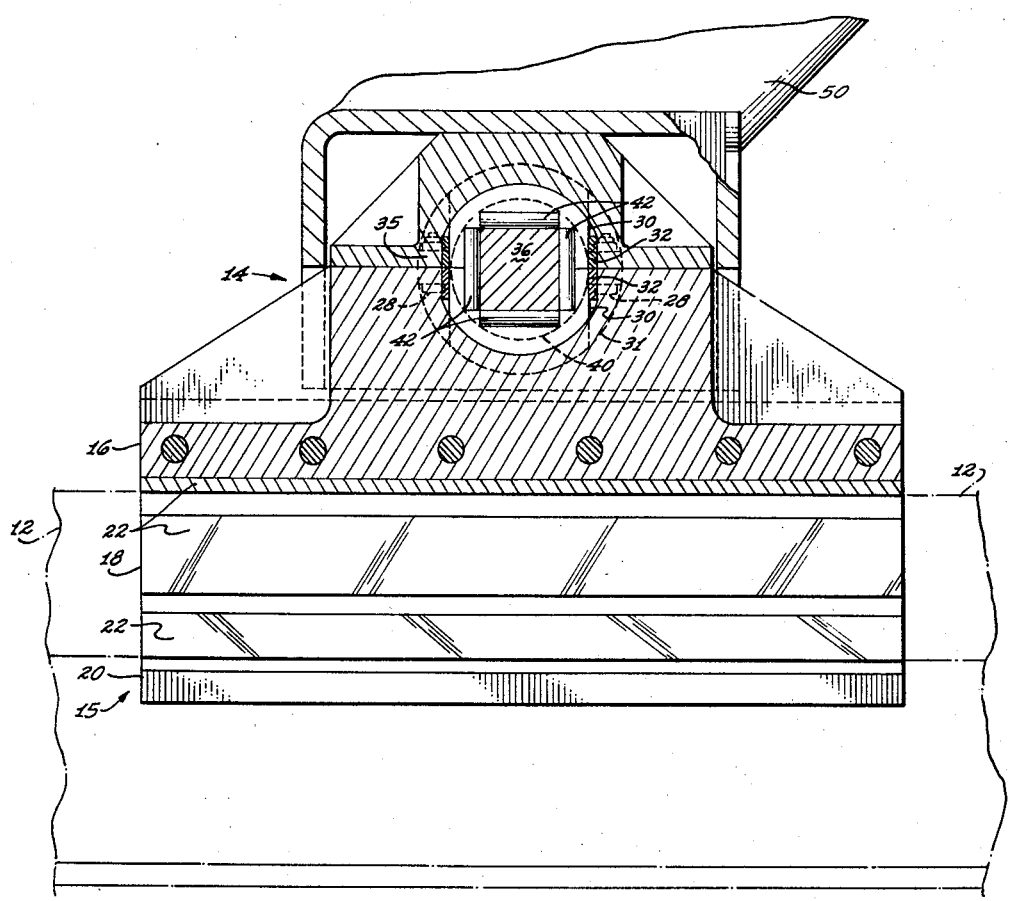
Figure 6 is a cross-sectional view taken on line 6—6 of Figure 3.

The axle broadly designated 24 is removably mounted in the concavity as shown in Figures 2 and 3. The axle comprises an elongated, cylindrical axle housing 26 divided into equal semi-cylindrical halves that are, in the assembled condition held together by bolts 28 and nuts 29. Each half of the housing 26 has a flange 31 on each end thereof as may be determined by referring to Figures 2 and 4 inclusive. Also each half of the housing 26 has opposed flats 30 thereon. The member 16, when the slipper and axle is assembled, is located between the flanges 31. Further, the member 16 has opposed inserts 32 therein, only one being shown, that contacts the flats 30 and prevents the housing 26 from rotating.

A trapezoidal shaped cap 34, having a concavity therein, overlies the member 16 and mates therewith. The cap 34 is located between the flanges 31 of the housing 26.

The cap 34 also has opposed inserts 35 therein, only one being shown, that contacts flats 30 and assists member 16 in preventing housing 26 from rotating. The housing 26 is restrained from rotating for the reason that rollers, to be hereinafter described, are to be retained in a desired position. If the rollers were permitted to rotate in a manner other than that for which they are designed, the operating effectiveness of the invention would be greatly reduced.

Located within the housing 26 and projecting from each end thereof is the axle that constitutes an elongated rod 36. Each projecting end is threaded to receive a nut 38, Figure 3. Spaced from each end and integral with the axle or rod 36 is an annular flange 40. That portion of the rod 36 between the flanges 40 is square in cross-section and when the axle 24 is in the assembled condition a plurality of spaces are provided between the housing 26 and the squared portion into which is located a plurality of hardened metal rollers 42. The squared portion of the axle conforms to the squared configuration of the interior of the housing 26 as illustrated in Figure 5. As a result of this configuration a line contact is provided for the rollers between the axle and the housing. Also located in the provided space are resilient cushions and spacers 44. As may be determined by referring to Figure 4 of the drawings the rollers 42 and cushions 44 are positioned between the flanges 40. The hardened metal rollers reduce the amount of friction that occurs.

A lubricant felt washer 45 and metal retainer ring 46 slides over each end of the rod 36 and is attached to the flanges 31 of the housing 26. Additionally a bumper or stop washer 48 is located between the nut 38 and a flange 31 on one end of the axle 24. There is a space between the flange 31 and the bumper 48 as may be determined by referring to Figure 3 of the drawings.

The sled 10 has a plurality of arms 50 thereon and each arm is U-shaped on the extreme end thereof. The cap 34 and a portion of member 16 is between the legs 52 and 54 of the arm 50. The threaded end of the axle or rod 36 extends through legs 52 and 54 and is restrained from movement by the nuts 38. The legs 52 and 54 are in a plane perpendicular to the arm 50.

As may be determined by referring to Figure 3 of the drawings a space is provided between leg 54 and the adjacent flanges 31. The result of this provision is that leg 54 functions as a bumper in the same manner as washer 48.

The operation of the invention is as follows: The sled 10 is propelled along the tracks or rails 12. As the sled is propelled lateral accelerations occur due to track distortion. The optimum operating condition, as stated, is to have the sled 10 travel in exactly a straight line. In order to approach this condition the slipper 15 and axle housing 26 as described, is capable of moving from side to side. It may be determined that the slippers 15 will follow the tracks 12. The housing 26 being fixed to the slippers 15 will follow the latter. The housing 26 is permitted lateral movement by virtue of being in contact with rollers 42 which also may move or roll resulting in a minimum of friction. When the housing 26 moves less than the extreme amount of lateral travel lateral motions are absorbed but when moved the extreme amount the flanges 31 strike bumper or stops 48 and leg 54. The cushions 44 provide a space for the rollers 42 to move back and forth while rolling within the housing 26 and on the axle 36. As a result most of the lateral forces are absorbed in the slippers and axles and the sled 10 is insulated from such motion.

Attention is directed to the fact that the axle or rod 36 does not move, but is rigidly held to the sled 10 by the nuts 38. The slipper 15 and housing 26 along with the rollers 42 move in a lateral direction with respect to the tracks or rails 12.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A slipper and axle assembly for a tracked vehicle comprising a support arm on and extending transversely to the line of travel of said vehicle; an elongated rod parallel to and rigidly supported, adjacent its ends by said arm; a pair of spaced apart annular flanges integral with said rod; said rod, between the flanges, being square in cross-section providing a plurality of parallel flat areas; a pair of spaced apart resilient cushions located between and in contacting relationship with said flanges and on each flat area thereof; rollers on each flat surface of said rod and between each pair of cushions; a slidable housing on and enclosing said rollers, cushions, flanges, and a portion of said rod; said housing being slidable longitudinally of said rod causing said rollers to be forced against the cushions thereby resiliently absorbing the movement of said housing; and a rail engaging slipper assembly rigidly connected to said housing.

References Cited in the file of this patent

UNITED STATES PATENTS

| | | |
|---|---|---|
| 454,307 | Tobey | June 16, 1891 |
| 1,443,556 | Beal et al. | Jan. 30, 1923 |
| 2,312,518 | Baldwin | Mar. 2, 1943 |
| 2,707,443 | Pope et al. | May 3, 1955 |
| 2,724,966 | Northrop et al. | Nov. 29, 1955 |
| 2,780,702 | Bourns | Feb. 5, 1957 |